United States Patent [19]

Sutherland et al.

[11] Patent Number: 5,626,349
[45] Date of Patent: May 6, 1997

[54] SELF-LUBRICATING SEALING RING

[75] Inventors: Ian B. Sutherland; Anthony R. Paleczny, both of Kitchener, Canada

[73] Assignee: N C Rubber Products Inc., Kitchener, Canada

[21] Appl. No.: 445,830

[22] Filed: May 22, 1995

[51] Int. Cl.$^6$ .................................................. F16J 15/10
[52] U.S. Cl. ............................ 277/207 A; 277/DIG. 10
[58] Field of Search ...................... 277/207 A, DIG. 10, 277/226

[56] References Cited

U.S. PATENT DOCUMENTS

| | | | |
|---|---|---|---|
| 3,058,752 | 10/1962 | Miller | 277/207 A |
| 3,653,675 | 4/1972 | Schaefer | 277/235 |
| 3,767,211 | 10/1973 | Amphlett | 277/1 |
| 3,869,393 | 3/1975 | Booker | 252/12.2 |
| 4,156,540 | 5/1979 | Currie | 285/94 |
| 4,172,598 | 10/1979 | Thomas | 277/1 |
| 4,299,399 | 11/1981 | Haaland | 277/207 A |
| 4,362,323 | 12/1982 | Lodder et al. | 285/4 |
| 4,365,818 | 12/1982 | Tolliver | 277/237 R |
| 4,410,185 | 10/1983 | Sporre | 277/207 A |
| 4,559,249 | 12/1985 | Arigaya et al. | 428/36 |
| 4,565,381 | 1/1986 | Joelson | 277/207 A |
| 4,934,716 | 6/1990 | Nordin et al. | 277/207 A |
| 4,946,175 | 8/1990 | Nordin et al. | 277/DIG. 10 |
| 5,096,206 | 3/1992 | Andre et al. | 277/207 A |
| 5,127,680 | 7/1992 | Takei | 285/94 |
| 5,143,381 | 9/1992 | Temple | 277/1 |
| 5,280,972 | 1/1994 | Anderson | 285/230 |

FOREIGN PATENT DOCUMENTS

| | | |
|---|---|---|
| 1014998 | 8/1977 | Canada. |
| 1022211 | 12/1977 | Canada. |
| 1026792 | 2/1978 | Canada. |
| 1029057 | 4/1978 | Canada. |
| 1038418 | 9/1978 | Canada. |
| 1053719 | 5/1979 | Canada. |
| 1065569 | 11/1979 | Canada. |
| 1126304 | 6/1982 | Canada. |
| 1139332 | 1/1983 | Canada. |
| 1172284 | 8/1984 | Canada. |
| 2019524 | 6/1990 | Canada. |

*Primary Examiner*—William A. Cuchlinski, Jr.
*Assistant Examiner*—John L. Beres
*Attorney, Agent, or Firm*—Arne I. Fors; Dale E. Schlosser; John R. Rudolph

[57] ABSTRACT

A sealing ring for fitting between and sealing an annular space between a spigot end of a length of pipe and a bell-shaped end of another length of pipe which are slid into each other to form a pipe joint. The sealing ring comprises an annular main body having a first surface for engaging the spigot end and a second surface for engaging the bell-shaped end during the formation of the pipe joint. A thin rupturable membrane of a thickness less than 0.008 inches is attached to the second surface about the circumference of the annular main body defining an annular cavity. A lubricant is disposed in the annular cavity, either between the second surface and the rupturable membrane or in an encapsulated cavity formed by the membrane whereby, when the spigot end and the bell-shaped end are slid into each other to form a pipe joint, the rupturable membrane is ruptured and the lubricant is released.

10 Claims, 4 Drawing Sheets

SELF-LUBRICATING SEALING RING

FIELD OF THE INVENTION

This invention relates to sealing devices for pipe joints and, more particularly, relates to a self-lubricating sealing ring for a pipe joint.

BACKGROUND OF THE INVENTION

Sealing rings are commonly used to seal pipe joints such as a bell and spigot joints in a pipe line. Lubricants such as a soap and water solution can be manually applied to the sealing rings to reduce the friction forces during the joining of two pipes. This is time consuming and messy work.

Self-lubricating sealing rings have been developed to avoid the manual labour involved in applying lubricant to a sealing ring and to expedite the process of joining two pipes.

U.S. Pat. No. 5,143,381 which issued Sep. 1, 1992 to Temple, discloses a sealing ring which has a closed chamber storing a lubricant such as grease. The sealing ring is placed upon the spigot end of a first pipe. The bell-shaped end of a second pipe engages the closed chamber and rolls back a flap formed in the sealing ring to open an annular slit thereby exposing a lubricant contained therein. In that the flap must be displaced onto the outer periphery of the ring, the thickness of the flap causes an undesirable radial pressure on the bell-shaped end of the second pipe.

U.S. Pat. No. 4,934,716 which issued Jun. 19, 1990 to Nordin et al., shows a sealing ring having a membrane attached to a substantially triangular body. The base of the triangular body of the sealing ring is placed on the spigot end of a first pipe. When the bell-shaped end of a second pipe is fitted onto the spigot end of the first pipe, it comes into contact with the membrane and slides along the membrane. At the same time, the membrane slides upon the triangular body. There is little frictional resistance between the membrane and the sealing ring due to the presence of a lubricant disposed therebetween. The membrane extends beyond the vertex of the triangular body when the seal is effected, necessitating the presence of an annular space to receive the thickness of the membrane doubled upon itself.

Sealing rings are usually comprised of rubber and extrusion is the most common method of forming rubber sealing rings. It is difficult to extrude rubber sealing rings with a thin membrane. The thinnest rubber membranes which may be formed by extrusion cause problems with the joint of existing pipes. Since the membrane extends beyond the vertex of the body of the sealing ring, when using sealing rings produced through extrusion such as those disclosed in U.S. Pat. No. 4,934,716, it affects the fitting of the joint. These products require the bell and spigot ends of two adjoining pipes to be machined to provide a wider joint than normal to allow for usage of these sealing rings.

SUMMARY OF THE INVENTION

The disadvantages of the prior art may be overcome by providing a sealing ring having a thin membrane for encapsulating a lubricant whereby when the sealing ring is used it does not require machining of the joints of the pipes to be joined to effect a seal between the pipes. More particularly, the sealing ring of the invention contains a lubricant covered by or enclosed within a thin membrane formed on an annular body whereby when connecting pipe joint members are slid into each other to form a pipe joint, the membrane is ruptured, releasing the lubricant and reducing the friction forces on the sealing ring during the joining of the pipes.

In its broad aspect, the sealing ring of the present invention for fitting between and sealing an annular space between connecting pipe joint members which are slid into each other to form a pipe joint comprises an annular main body and a thin membrane having a thickness less than 0.008 inches attached thereto. The annular body has a first surface engaging one of the pipe joint members and a second surface for engaging the other pipe joint member during the formation of the pipe joint. The membrane is attached to the second surface and is rupturable by contact with the other pipe joint. A lubricant disposed circumferentially on the sealing ring on the second surface is released when the pipe joint members are slid into each other to form a pipe joint and the membrane is ruptured.

In a preferred embodiment, the sealing ring is for fitting between and sealing a space between a sealing surface of a spigot end of a length of pipe and a sealing surface on a bell shaped end of another length of pipe which are slid into each other to form a pipe joint. The membrane of the sealing ring may be balloon- shaped to encapsulate the lubricant.

BRIEF DESCRIPTION OF THE DRAWINGS

The present invention will now be described in detail with reference to the accompanying drawings, in which.

DESCRIPTION OF THE PREFERRED EMBODIMENTS

Figure 1:
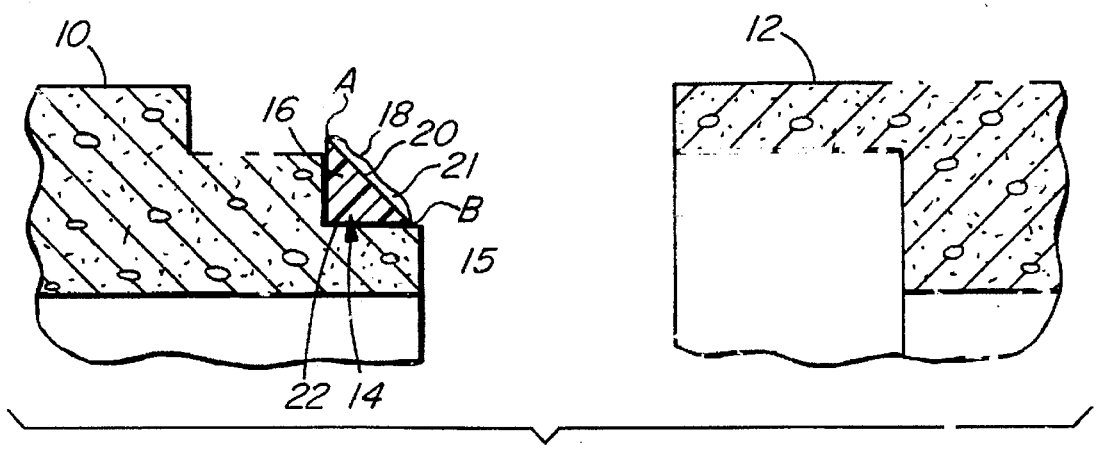
FIG. 1 is a fragmentary cross-sectional elevational view of the sealing ring of the present invention positioned on a spigot end of a pipe.

Referring first to FIG. 1, two coaxial concrete pipes are shown having mating spigot end 10 and bell-shaped end 12. The seal between the pipes is to be effected by the sealing ring 14. The base 15 of the sealing ring 14 of the invention abuts shoulder 22 of spigot end 10 of the first pipe. The sealing ring 14 consists of an annular main body portion 16 having a substantially triangular shape and a membrane 18 which is connected about the circumference of the sealing ring at the vertex A of the main body portion 16 and at B of the main body portion 16. The main body portion 16 is preferably constructed from an elastomeric material such as vulcanized rubber.

The membrane 18 may be attached to the surface 20 of the main body portion 16 of sealing ring 14 by pressure-heat sealing or by a pressure sensitive adhesive. The membrane 18 is comprised of any suitable material which will be rupturable by contact with the bell-shaped end of the second adjoining pipe. Preferably, the membrane 18 is comprised of polyethylene and ethylene vinyl acetate polymer in 9% weight ratio and has a thickness of 0.004 in to 0.008 in.

The attachment of the membrane 18 to the surface 20 of the main 5 body portion 16 of the sealing ring 14 creates a pocket 21. A lubricant such as a vegetable off based lubricant, such as those known as WL-5™, which is comprised of mica, is placed circumferentially on surface 20 of main body portion 16. The lubricant may be placed anywhere on surface 20 and will be in contact with membrane 18 when it is attached.

Figure 2:
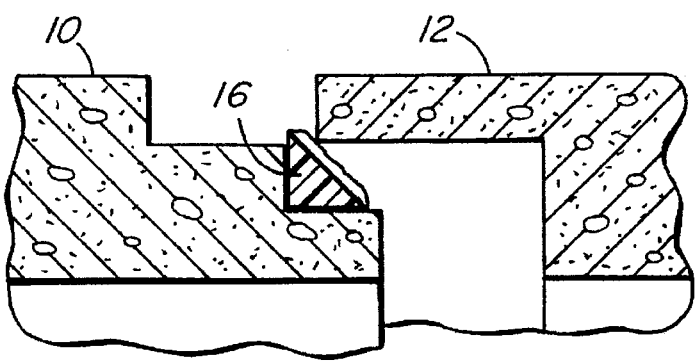
FIG. 2 is a fragmentary cross-sectional elevational view of the sealing ring coming into contact with the bell-shaped end of a second pipe.

When joining the two pipes, the bell-shaped end 12 of the second pipe comes into contact with the membrane 18 as shown in FIG. 2. As the axial alignment of the pipes may not be exact, the bell-shaped end 12 may come into contact with the membrane 18 at various places on surface 20.

Figure 3:
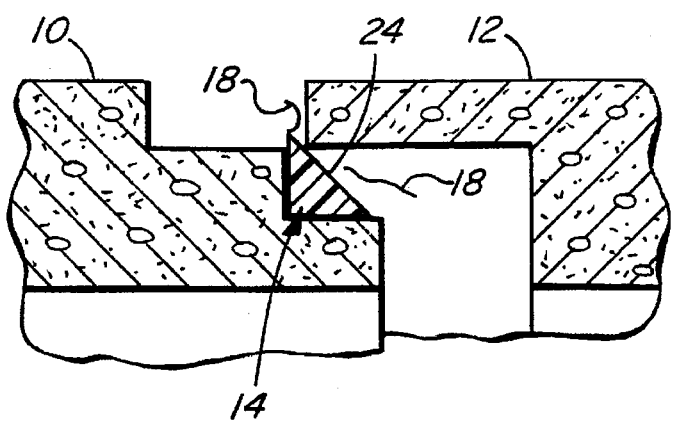
FIG. 3 is a fragmentary cross-sectional elevational view of the sealing ring showing the membrane being ruptured by the bell-shaped end of the second pipe.

The contact of the bell-shaped end 12 with sealing ting 14 ruptures the membrane 18 exposing the lubricant, as shown in FIG. 3. The thinness of the membrane 18 allows for facile breakage of the membrane upon contact with bell-shaped end 12, or membrane 18 may have a perforation to facilitate its rupture when contacted by bell-shaped end 12.

As shown in FIG. 3, the membrane 18 may be displaced from main body portion 16 upon contact with bell-shaped end 12. Lubricant 24 comes directly into contact with bell-shaped end 12 and reduces frictional forces as the two pipes are joined together. Membrane 18 may stay affixed to main body portion 16 at positions A and B or the force of the connection of the two pipes may in some circumstances separate membrane 18 from main body portion 16.

Figure 4:
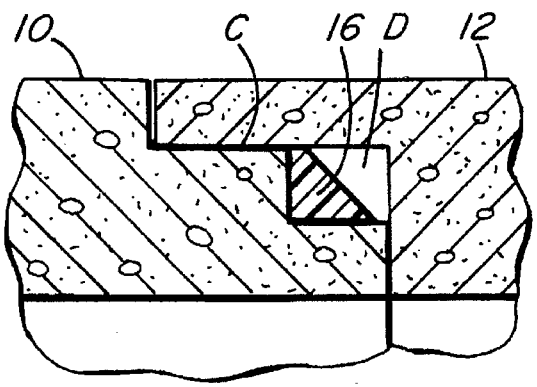
FIG. 4 is a fragmentary cross-sectional elevational view of the sealing ring showing the spigot end of the first pipe within the bell-shaped end of the second pipe.
Figure 5:
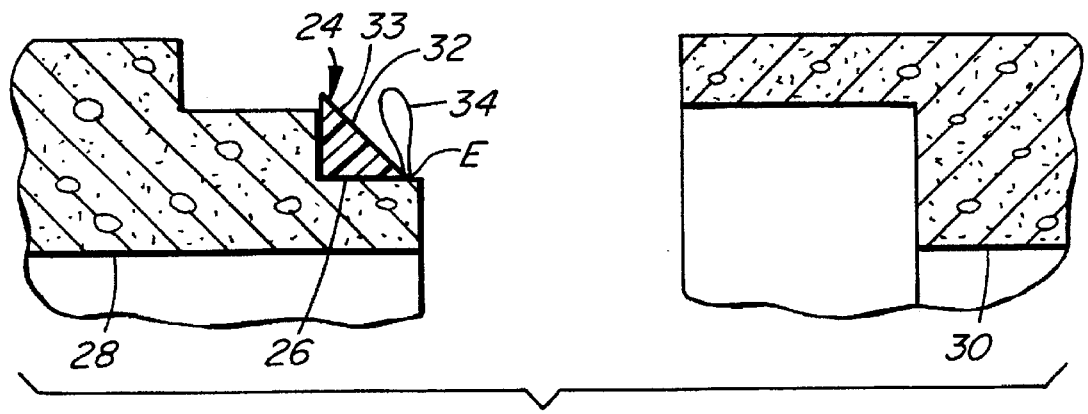
FIG. 5 is a fragmentary cross-sectional elevational view of another embodiment of the sealing ring of the present invention positioned on the spigot end of a pipe.

FIG. 4 shows the final sealed position of spigot end 10 and bell-shaped end 12. The main body portion 16 of sealing ring 14 is compressively deformed to seal the joint between the two pipes. The remnants of membrane 18 may be present in cavity C or cavity D. As is evident from FIG. 4, when the pipes are joined, cavity C is minute. The thinness of the membrane 18 does not cause problems with the fitting of the joint of some remnants are within cavity C. If materials accumulated in cavity C after joinder of spigot end 10 and bell-shaped end 12, such as would be inherent in the prior art devices, it could cause deflection of the pipes. Such pipe deflection would cause strain on the joint. Also, if relatively thick membranes are utilized, the standard dimensions, for example, for a concrete pipe joint would not be sufficient to allow for the membrane to be displaced into cavity C.

In FIGS. 5–8, there is shown a second embodiment of a sealing ring 24 of the invention. Sealing ring 24 is generally triangular shape and abuts shoulder 26 of spigot end 28 of a first pipe. The sealing ring 24 consists of a main body portion 32 and balloon shaped membrane 34. The main body portion 32 is preferably constructed from an elastomeric material such as vulcanized rubber.

Membrane 34 is connected to the main body portion 32 at position E near the base of main body portion 32 on surface 33. The membrane 34 may be attached to the main body portion 32 by pressure-heat sealing or by a pressure sensitive adhesive or like means. The membrane 34 is comprised of any suitable material which will be rupturable by contact with the bell-shaped end 30 of an adjoining second pipe. Preferably, the membrane 18 is comprised of the polyethylene/ethylene vinyl acetate polymer mixture described above.

A lubricant such as a vegetable of based lubricant such as WL-5™ is encapsulated within the membrane 34.

Figure 6:
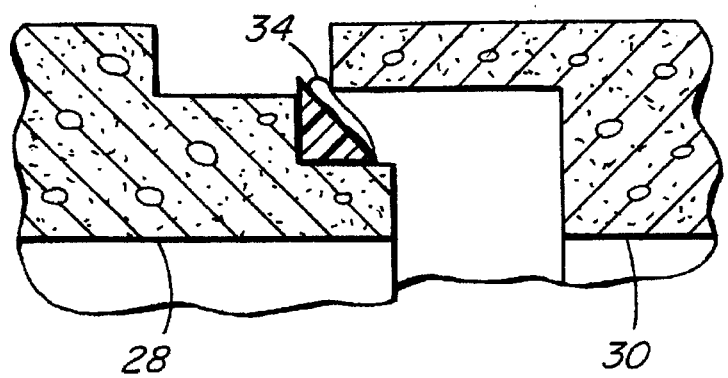
FIG. 6 is a fragmentary cross-sectional elevational view of the sealing ring of FIG. 5 coming into contact with the bell-shaped end of a second pipe.
Figure 7:
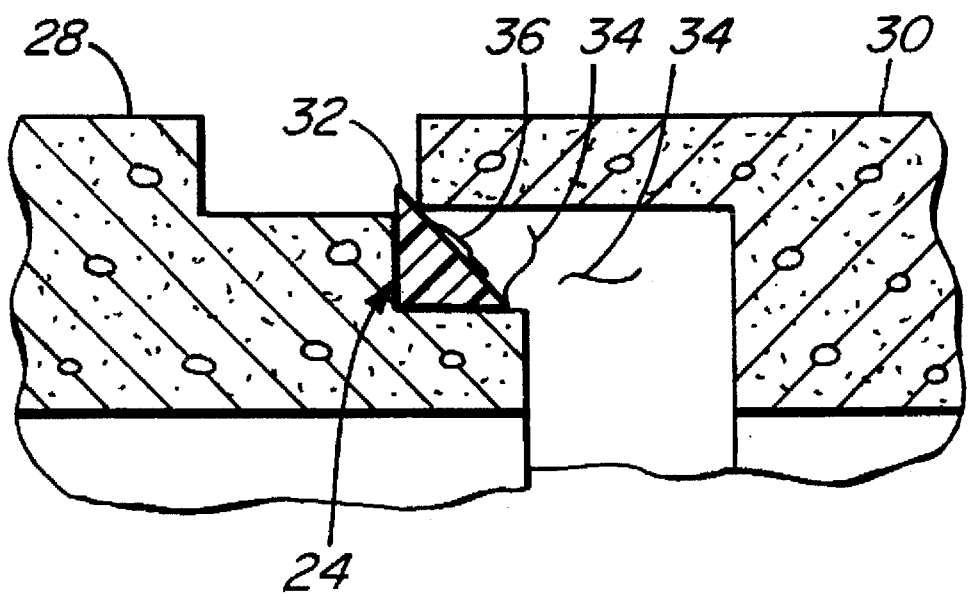
FIG. 7 is a fragmentary cross-sectional elevational view of the sealing ring showing the spigot end of the first pipe within the bell-shaped end of the second pipe.

FIG. 6 shows bell-shaped end 30 coming into contact with membrane 34. FIG. 7 shows the rupturing of the membrane 34 by the contact with the bell-shaped end 30, thereby exposing the lubricant. As mentioned above, the thinness of the membrane 34 allows for the fiche rupturing upon contact. The lubricant 36 is then exposed to bell-shaped end 12 to reduce the frictional forces which occur during the joining of the two pipes. The membrane 34 may be displaced from main body portion 32 upon contact with bell-shaped end 30.

Figure 8:
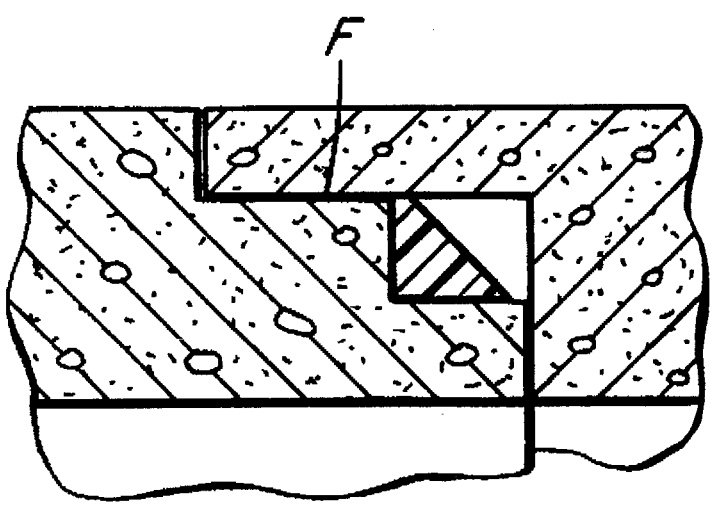
FIG. 8 is a fragmentary cross-sectional elevational view of another embodiment of the sealing ring of the present invention positioned on the spigot end of a pipe.

FIG. 8 shows the final position of spigot end 10 and bell-shaped end 12. The main body portion 32 of sealing ring 26 is compressively deformed to seal the joint of the two pipes. The remnants of the membrane 34 may appear in cavity F, however, the thinness of the membrane 34 avoids problems from deflection of the pipes.

Figure 9:
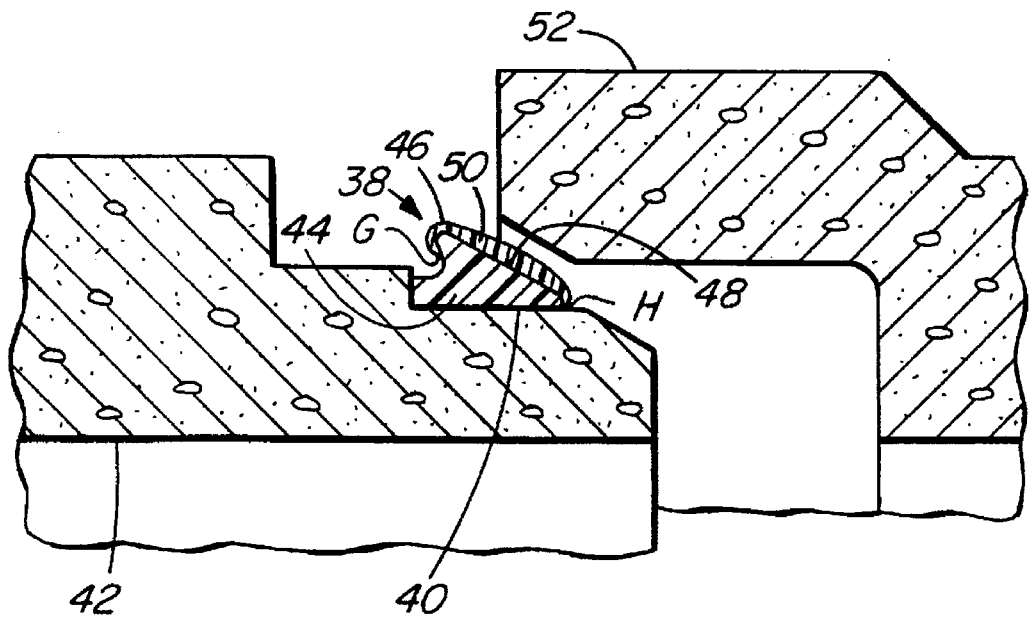
FIG. 9 is a fragmentary cross-sectional elevational view of a still further embodiment of the sealing ring of the present invention positioned on the spigot end of a pipe.
Figure 10:
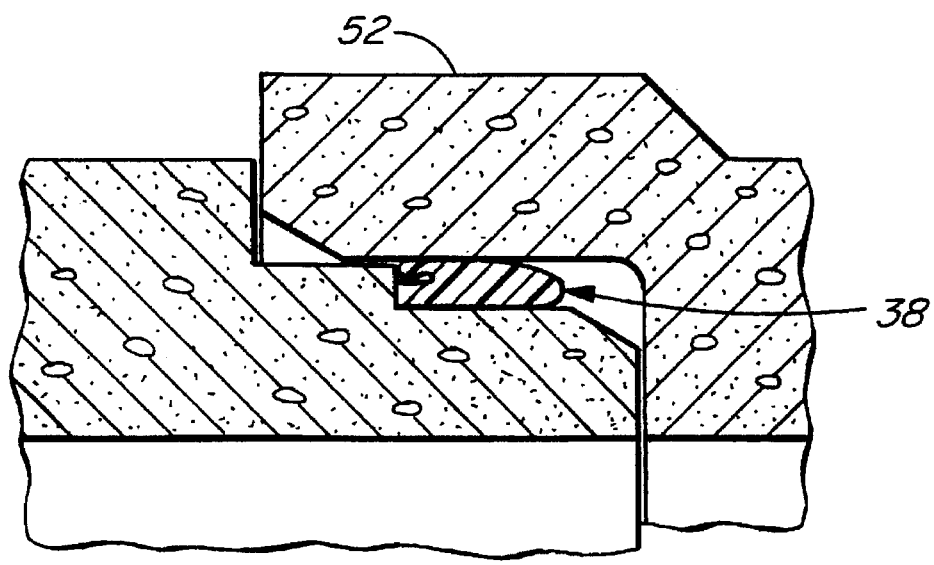
FIG. 10 is a fragmentary cross-sectional elevational view of the sealing ring of FIG. 9 showing the spigot end of the first pipe within the bell-shaped end of the second pipe.

In FIGS. 9 and 10, there is shown another embodiment of the o sealing ring of the invention. The sealing ring is depicted generally as numeral 38. The sealing ring 38 has a substantially triangular shape and abuts shoulder 40 of spigot end 42 of the first pipe. The sealing ring 38 consists of an annular main body portion 44 and a membrane 46 which is connected about the circumference of the sealing ring at positions G and H to the main body portion 44. The attachment of the membrane 46 to the main body portion 44 of the sealing ring 38 to envelop surface 48 creates a pocket 50. A lubricant is placed circumferentially on surface 48 of main body portion 44 in the pocket 50. The lubricant will be in contact with the underside of the membrane 46.

The membrane 46 is comprised of any suitable material which may be rupturable by contact with the bell-shaped end 52 of an adjoining second pipe and has a thickness of 0.004 in to 0.008 in.

When joining the two pipes, the bell-shaped end 52 of the second pipe comes into contact with the membrane 46 and ruptures the membrane 46. The lubricant comes directly into contact with bell-shaped end 52 and reduces frictional forces as the two pipes are joined together.

The main body portion 44 of the sealing ring 38 is distorted from its original shape as shown in FIG. 9 to the shape illustrated in FIG. 10 when the pipes 42 and 52 are joined.

It will be understood that modifications can be made in the embodiments of the invention described herein without departing from the scope and purview of the invention as defined by the appended claims.

We claim:

1. A sealing ring for fitting between and sealing an annular space between connecting pipe joint members which are slid into each other to an assembled position to form a pipe joint, said sealing ring comprising:

an annular main body having a substantially triangular shape having a vertex and a base, said base engaging one of the pipe joint members, and said body having an inclined surface between said vertex and said base defining a corner with said base, for engaging the other pipe joint member during the formation of the pipe joint;

a thin rupturable membrane of a thickness less than 0.008 inches attached to said inclined surface proximate said vertex and proximate said corner about the circumference of the annular main body defining an annular cavity, said cavity defined between said membrane and said inclined surface;

a lubricant disposed in said cavity about the circumference of the annular main body whereby said pipe joint members are slid into each other to form a pipe joint, said rupturable membrane is ruptured and said lubricant is released.

2. A sealing ring for fitting between and sealing an annular space between connecting pipe joint members which are slid into each other to form a pipe joint as claimed in claim 1, wherein one of said pipe joint members comprises a spigot end of a pipe and the other pipe joint member comprises a bell-shaped end of another length of pipe.

3. A sealing ring for fitting between and sealing an annular space between connecting concentric pipe joint members which are slid into each other to form a pipe joint, said sealing ring comprising:

an annular main body having substantially triangular shape having a vertex and a base, said base engaging one of the pipe joint members, and said body having an inclined surface between said vertex and said base defining a corner with said base, for engaging the other pipe joint member during the formation of the pipe joint;

a thin rupturable membrane of a thickness less than 0.008 inches attached to said inclined surface proximate said vertex and proximate said corner about the circumference of the annular main body, said rupturable membrane forming an encapsulated cavity;

a lubricant disposed in the encapsulated cavity within said membrane whereby when said pipe joint members are slid into each other to form a pipe joint said rupturable membrane is ruptured and said lubricant is released.

4. A sealing ring for fitting between and sealing an annular space between connecting pipe joint members which are slid into each other to form a pipe joint as claimed in claim 3, wherein one of said pipe joint members comprises a spigot end of a pipe and the other pipe joint member comprises a bell-shaped end of another length of pipe.

5. A sealing ring for fitting between and sealing an annular space between connecting pipe joint members which are axially slid into each other to form a pipe joint, said seating ring comprising:

an annular main body having a substantially triangular shape having a vertex and a base, said base engaging one of the pipe joint members, and said body having an inclined surface between said vertex and said base defining a corner with said base, for engaging the other pipe joint member during the formation of the pipe joint;

a thin rupturable membrane of a thickness of 0.004 inches to 0.008 inches attached to said inclined surface proximate said vertex and proximate said corner about the circumference of the annular main body defining an annular cavity, said cavity defined between said membrane and said inclined surface;

a lubricant disposed in said cavity about the circumference of the annular main body whereby when said pipe joint members are slid into each other to form a pipe joint said rupturable membrane is ruptured and said lubricant is released.

6. A sealing ring for fitting between and sealing an annular space between connecting annular pipe joint members which are slid into each other to form a pipe joint as claimed in claim 5 wherein said rupturable membrane has a circumferential perforation to facilitate the rupturing of said rupturable membrane.

7. A sealing ring for fitting between and sealing an annular space between connecting pipe joint members which are slid into each other to form a pipe joint as claimed in claim 6, wherein one of said pipe joint members comprises a spigot end of a pipe and the other pipe joint member comprises a bell-shaped end of another length of pipe.

8. A sealing ring for fitting between and sealing an annular space between connecting concentric pipe joint members which are slid into each other to form a pipe joint, said sealing ring comprising:

an annular main body having a substantially triangular shape having a vertex and a base, said base engaging one of the pipe joint members and, said body having an inclined surface between said vertex and said base defining a corner with said base, for engaging the other pipe joint member during the formation of the pipe joint;

a thin rupturable membrane of a thickness of 0.004 inches to 0.008 inches attached to said inclined surface proximate said vertex and proximate said corner about the circumference of the annular main body, said rupturable membrane forming an encapsulated cavity;

a lubricant disposed in the encapsulated cavity within said membrane whereby when said pipe joint members are slid into each other to form a pipe joint said rupturable membrane is ruptured and said lubricant is released.

9. A sealing ring for fitting between and sealing an annular space between connecting pipe joint members which are slid into each other to form a pipe joint as claimed in claim 8 wherein said rupturable membrane has a circumferential perforation to facilitate the rupturing of said rupturable membrane.

10. A sealing ring for fitting between and sealing an annular space between connecting pipe joint members which are slid into each other to form a pipe joint as claimed in claim 9, wherein one of said pipe joint members comprises a spigot end of a pipe and the other pipe joint member comprises a bell-shaped end of another length of pipe.

* * * * *